(12) United States Patent
Chuah

(10) Patent No.: US 6,970,423 B2
(45) Date of Patent: Nov. 29, 2005

(54) UNIVERSAL MOBILE TELECOMMUNICATIONS SYSTEM (UMTS) QUALITY OF SERVICE (QOS) SUPPORTING ASYMMETRIC TRAFFIC CLASSES

(75) Inventor: Mooi Choo Chuah, Marlboro, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 859 days.

(21) Appl. No.: 09/764,647

(22) Filed: Jan. 18, 2001

(65) Prior Publication Data

US 2002/0093936 A1 Jul. 18, 2002

(51) Int. Cl.[7] ............................................. H04J 3/24
(52) U.S. Cl. ...................... 370/230; 370/328; 370/352
(58) Field of Search ................................ 370/230, 236, 370/329, 328, 338, 352–356, 401, 410, 348

(56) References Cited

U.S. PATENT DOCUMENTS

| | | | |
|---|---|---|---|
| 6,031,832 A * | 2/2000 | Turina ........................ | 370/348 |
| 6,621,793 B2 * | 9/2003 | Widegren et al. ......... | 370/230.1 |
| 6,654,610 B1 * | 11/2003 | Chen et al. ................. | 455/450 |
| 6,665,280 B2 * | 12/2003 | Forssell et al. ............ | 370/329 |
| 6,683,853 B1 * | 1/2004 | Kannas et al. ............. | 370/237 |
| 6,728,208 B1 * | 4/2004 | Puuskari ..................... | 370/230.1 |

FOREIGN PATENT DOCUMENTS

| | | | |
|---|---|---|---|
| EP | 0 854 536 A1 | 7/1998 | ............ H04B 7/26 |
| WO | 00 10357 A1 | 2/2000 | ............ H04Q 7/38 |
| WO | 00 67498 | 11/2000 | ............ H04Q 7/20 |

OTHER PUBLICATIONS

3G Technical Specification (TS) 23.060 V3.4.0: "Technical Specification Group Services and System Aspects; General Packet Radio Service (GPRS); Service Description; Stage 2; (Release 1999)," 3rd Generation Partnership Project (3GPP).
3G Technical Specification (TS) 23.107 V3.3.0: "Technical Specification Group Services and System Aspects; QoS Concept and Architecture; (Release 1999)," 3rd Generation Partnership Project (3GPP).
3G Technical Specification (TS) 24.008 V3.4.1: "Technical Specification Group Core Network; Mobile radio interface layer 3 specification; Core Network Protocols—Stage 3; (Release 1999)," 3rd Generation Partnership Project (3GPP).

* cited by examiner

*Primary Examiner*—Ricky Ngo
*Assistant Examiner*—Richard Chang

(57) ABSTRACT

A UMTS (Universal Mobile Telecommunications System) core network supports the negotiation of asymmetric traffic classes with a mobile station (MS) (or user equipment (UE)). A new quality of service (QoS) information element (IE) is defined that allows for the MS to negotiate for asymmetric traffic classes.

12 Claims, 9 Drawing Sheets

Chuah 53

Packet Data Protocol (PDP) Context Activation Procedure

Prior Art

FIG. 5

| D bit | Traffic Class Field Value | Traffic Class |
|---|---|---|
| 0 | 000 | Subscribed traffic class/Reserved |
| 0 | 001 | Conversational |
| 0 | 010 | Streaming |
| 0 | 011 | Interactive |
| 0 | 100 | Background |
| 0 | 101 | Reserved |
| 0 | 110 | Reserved |
| 0 | 111 | Reserved |
| 1 | 000 | Subscribed traffic class/Reserved |
| 1 | 001 | Conversational |
| 1 | 010 | Streaming |
| 1 | 011 | Interactive |
| 1 | 100 | Background |
| 1 | 101 | First try Streaming, then Interactive |
| 1 | 110 | First try Interactive, then Background |
| 1 | 111 | First try Streaming, then Interactive, then Background |

Chuah 53

FIG. 7

Chuah 53

| U bit | D bit | Traffic Class Field Value | Traffic Class |
|---|---|---|---|
| 0 | 0 | 000 | Subscribed traffic class/Reserved |
| 0 | 0 | 001 | Conversational |
| 0 | 0 | 010 | Streaming |
| 0 | 0 | 011 | Interactive |
| 0 | 0 | 100 | Background |
| 0 | 0 | 101 | Reserved |
| 0 | 0 | 110 | Reserved |
| 0 | 0 | 111 | Reserved |

. . .

| | | | |
|---|---|---|---|
| 1 | 0 | 101 | Interactive to Streaming |
| 1 | 0 | 110 | Best Effort to Interactive |
| 1 | 0 | 111 | Best Effort to Streaming, else to Interactive |

UNIVERSAL MOBILE TELECOMMUNICATIONS SYSTEM (UMTS) QUALITY OF SERVICE (QOS) SUPPORTING ASYMMETRIC TRAFFIC CLASSES

CROSS-REFERENCE TO RELATED APPLICATIONS

Related subject matter is disclosed in the co-pending, commonly assigned, U.S. Patent application of Chuah, entitled "Universal Mobile Telecommunications (UMTS) Quality of Service (QoS) Supporting Variable QoS Negotiation," application Ser. No. 09/764,510, filed on Jan. 18, 2001.

FIELD OF THE INVENTION

This invention relates generally to communications and, more particularly, to packet communications systems.

BACKGROUND OF THE INVENTION

As wireless systems continue to evolve, communications between a mobile switching center (MSC) and its base stations are moving to an Internet Protocol (IP) based transport mechanism. (As used herein, the term wireless systems refers to e.g., CDMA (code division multiple access), GSM (Global System for Mobile Communications), the proposed UMTS (Universal Mobile Telecommunications System), etc.) As such, "push services" are envisioned as being available on, e.g., UMTS. In "push services," a user goes, e.g., to an Internet web site to establish a profile for the data they want sent to them and the time they want it sent. Once these conditions have been satisfied, the messages are automatically "pushed" to the user's equipment (UE) (also referred to herein as the mobile station (MS)).

Continuing with UMTS as an example, Technical Specification (TS) 23.060 requires that the MS requests symmetric traffic classes (uplink—from the MS to the GPRS, and downlink—from the GPRS to the MS) in a packet data protocol (PDP) context (e.g., see 3G TS 23.060 V3.4.0 (2000-07) 3 GPP General Packet Radio Service (GPRS); Service Description; Stage 2 (Release 99)). As such, the Quality of Service (QoS) information element (IE) described in the above-mentioned TS 23.060 specification only allows an MS to negotiate for one traffic class (covering both the uplink and the downlink) in a PDP context activation procedure. In addition, if the GPRS doesn't have sufficient resources at that time to meet a particular QoS request, the MS has to retry with another QoS request, via yet another PDP context activation procedure. Such retries create unnecessary delay in setting up a PDP context with the appropriate QoS that the user desires.

SUMMARY OF THE INVENTION

Unfortunately, push services are but one example where there may be an imbalance in the desired traffic class for the uplink and the downlink directions in providing a service to a user. For example, for a "push service request," the user may use a "interactive" traffic class, while desiring a "streaming" traffic class for downloading music. Thus, there is a need in a wireless system, or general packet radio type system, to allow such asymmetric traffic class negotiation by a mobile station for services between the mobile station and the wireless system.

In an illustrative embodiment, a UMTS core network supports the negotiation of asymmetric traffic classes with an MS. In particular, a new QoS IE is defined that allows for the MS to negotiate for asymmetric traffic classes.

BRIEF DESCRIPTION OF THE DRAWING

FIG. 5 shows an illustrative mapping of traffic class in support of a downgradeable quality of service;

FIG. 7 shows an illustrative mapping of traffic class in support of an upgradeable quality of service;

DETAILED DESCRIPTION

Figure 1:
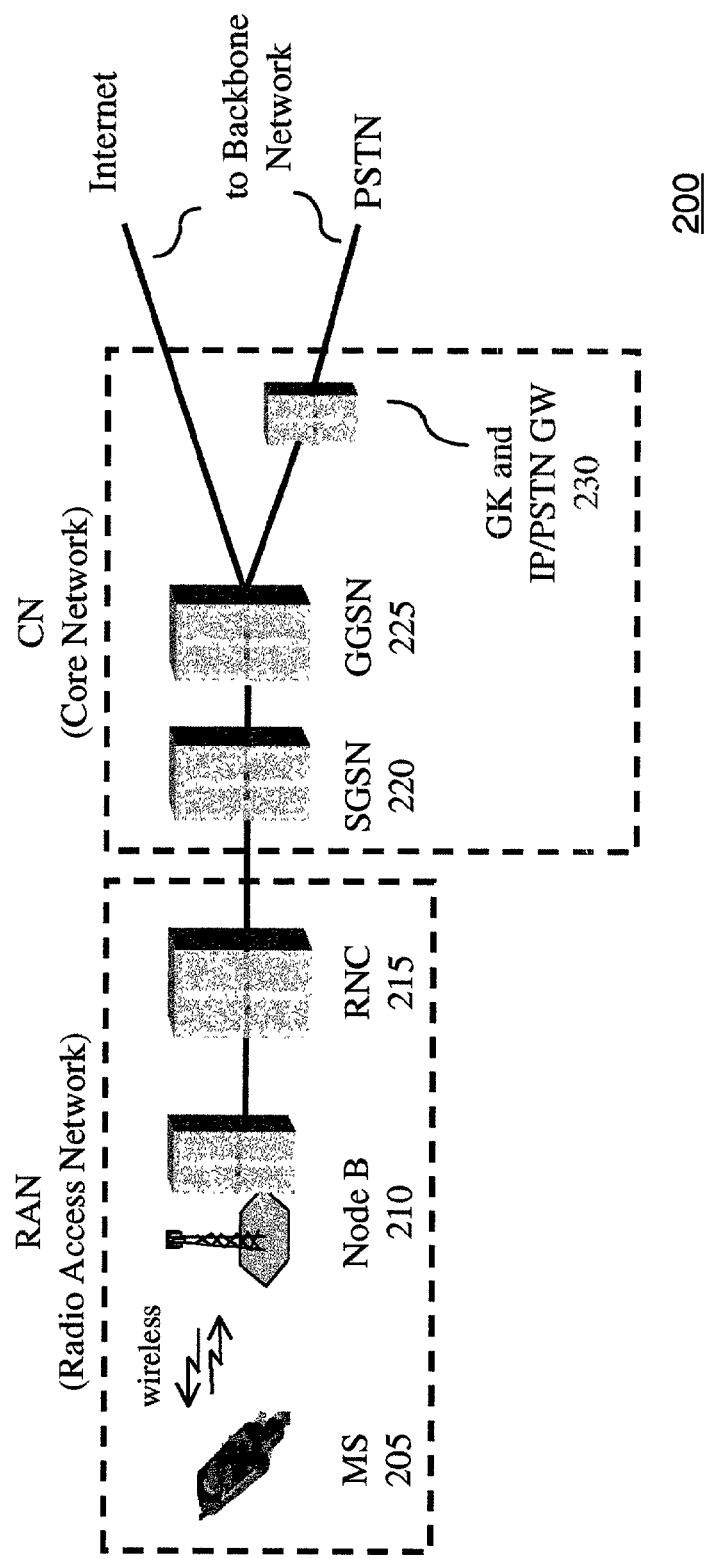
FIG. 1 shows a UMTS network embodying the principles of the invention.

An illustrative UMTS network 200 modified in accordance with the principles of the invention (described below) is shown in FIG. 1. Other than the inventive concept, the elements shown in FIG. 1 are well known and will not be described in detail. For example, UMTS network 200 comprises a radio access network (RAN) (also referred to herein as a "UMTS Terrestrial Radio Access Network" (UTRAN)) and a core network (CN). The CN is also coupled to a backbone network (not shown). The latter comprises the Internet and the public switched telephone network (PSTN) for providing access to other endpoints. The RAN comprises mobile station (MS) 205 (also referred to herein as a wireless endpoint), node B 210 and radio network controller 215. (Although UMTS uses the term "node B," this is also referred to as a base station.) The CN comprises a serving GPRS support node (SGSN) 220, gateway GPRS support node (GGSN) 225 and element 230, which comprises a gatekeeper (GK) (a component in ITU H.323) and an IP/PSTN gateway (GW) (for translation between H.323 and the PSTN). Although shown as single block elements, the elements of UMTS network 200 include stored-program-control processors, memory, and appropriate interface cards (not shown). The term "packet server" as used herein refers to any packet processor, illustrations of which are various ones of the above-mentioned elements of UMTS 200, e.g., SGSN 220, MS 205, etc. Finally, the inventive concept is implemented using conventional programming techniques, which as such, will not be described herein.

Figure 2:
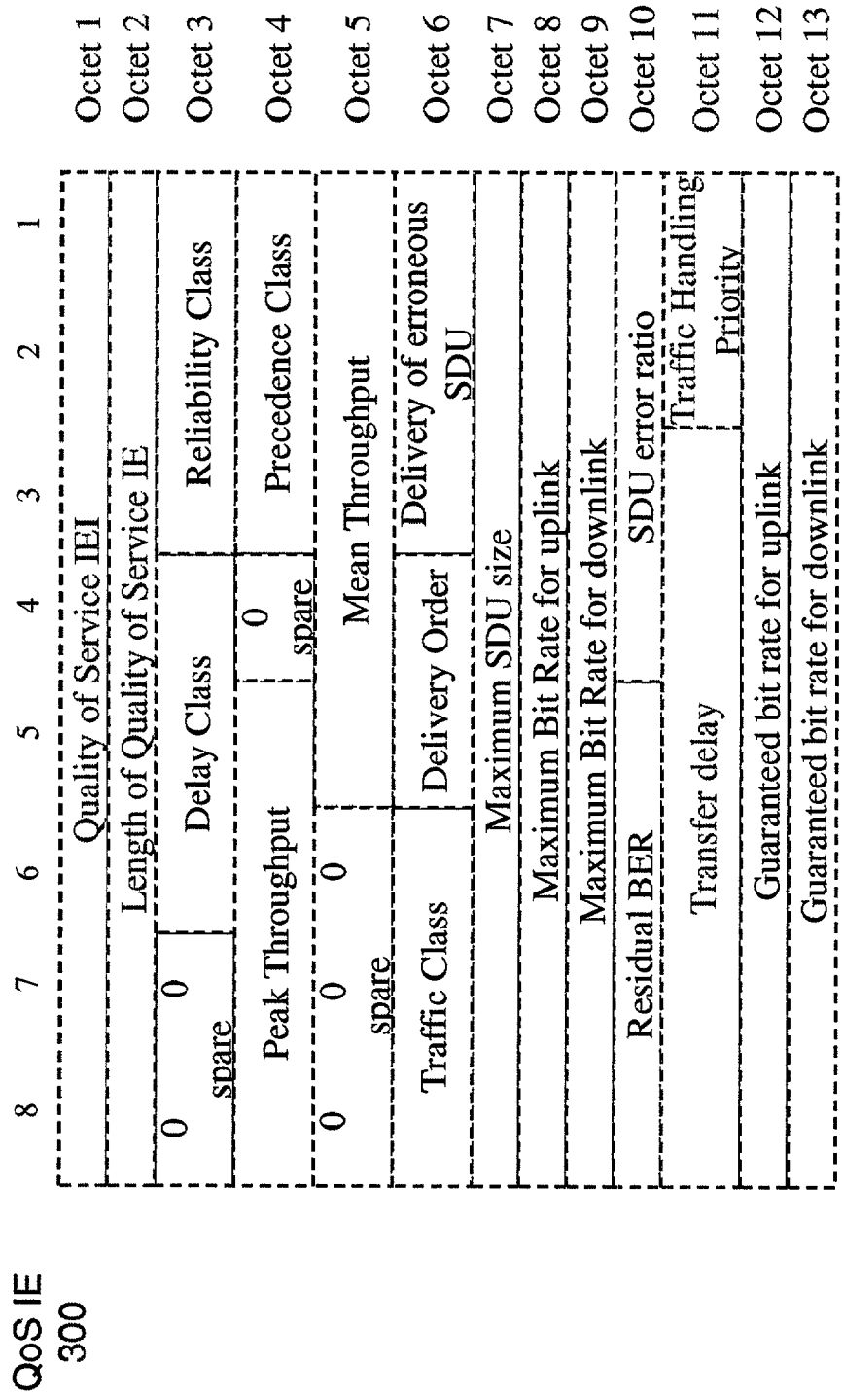
FIG. 2 shows a prior art QoS IE.
Figure 3:
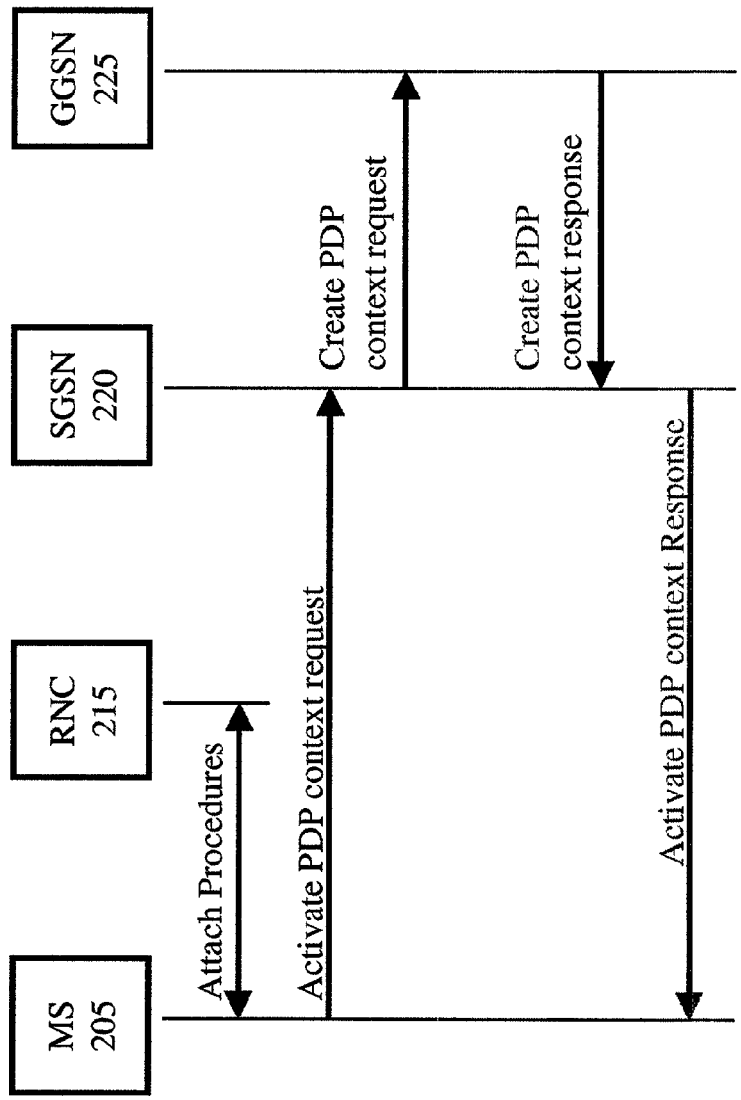
FIG. 3 shows a prior art PDP activation procedure.

Before describing an illustrative embodiment of the invention, the prior art quality of service (QoS) information element (IE) and packet data protocol (PDP) context activation procedure is described and illustrated in FIGS. 2 and 3, respectively. (For more information see the above-referenced TS 23.060 specification; and 3G Technical Specification (TS) 23.107 V3.3.0: "Technical Specification Group Services and System Aspects; QoS Concept and Architecture; (Release 1999)," 3$^{rd}$ Generation Partnership Project (3GPP)). Other than the inventive concept, the description that follows utilizes well known UMTS information fields and message flows, which are not described herein.

A QoS IE is coded, or formatted, as shown in QoS IE 300 of FIG. 2. The QoS IE 300 has a length of 13 octets (an octet is 8 bits wide) and specifies QoS parameters for a PDP context. The first two octets define the type of information element (here, a QoS IE) and its length. Octet 3 holds two spare bits and also communicates the delay class and the reliability class (three bits each). Octet 4 conveys the peak throughput, precedence class and a spare bit. Octet 5 conveys the mean throughput and three spare bits. Octet 6 conveys the traffic class (conversational, streaming, interactive, or background), delivery order (whether the UMTS bearer shall provide in-sequence service data units (SDUs) delivery or not) and delivery of erroneous SDU (whether SDUs detected as erroneous shall be delivered or discarded). Since an SDU is a packet comprising a payload, octet 7 conveys the maximum SDU size. Octets 8 and 9 convey the maximum bit rates for the uplink direction and downlink directions, respectively. Octet 10 conveys the residual bit error rate (BER) (which indicates the undetected bit error ratio in the delivered SDUs), and the SDU error ratio (which indicates the fraction of SDUs lost or detected as erroneous). Octet 11 conveys the transfer delay and the traffic handling priority. Finally, octets 12 and 13 convey the guaranteed bit rates for the uplink and downlink, respectively.

As noted above, a QoS IE specifies QoS parameters for a PDP context. An illustrative prior art message flow for activating a PDP context is shown in FIG. 3. After the "Attach Procedures" are performed between MS 205 (of FIG. 1) and RNC 215 (as known in the art), MS 205 transmits to SGSN 220 an "Activate PDP (packet data protocol) context" request message comprising the above-described QoS IE. (It should be noted that during a PDP context activation procedure other messages may be communicated between the various packet servers shown in FIG. 1, and have been omitted for simplicity. For example, "radio access bearer" (RAB) setup may be performed. In addition, there may be error conditions encountered. For example, the SGSN may reject the PDP context activation request under certain conditions. Additional information can be found in the above-mentioned TS 23.060 V3.4.0.) In response, SGSN 220 sends a "Create PDP context" request message to GGSN 225. GGSN 225 responds with a "Create PDP context" response message as an acknowledgment. Upon receipt of the "Create PDP context" response message, SGSN 220 sends an "Activate PDP context" response message to MS 205.

Figure 4:
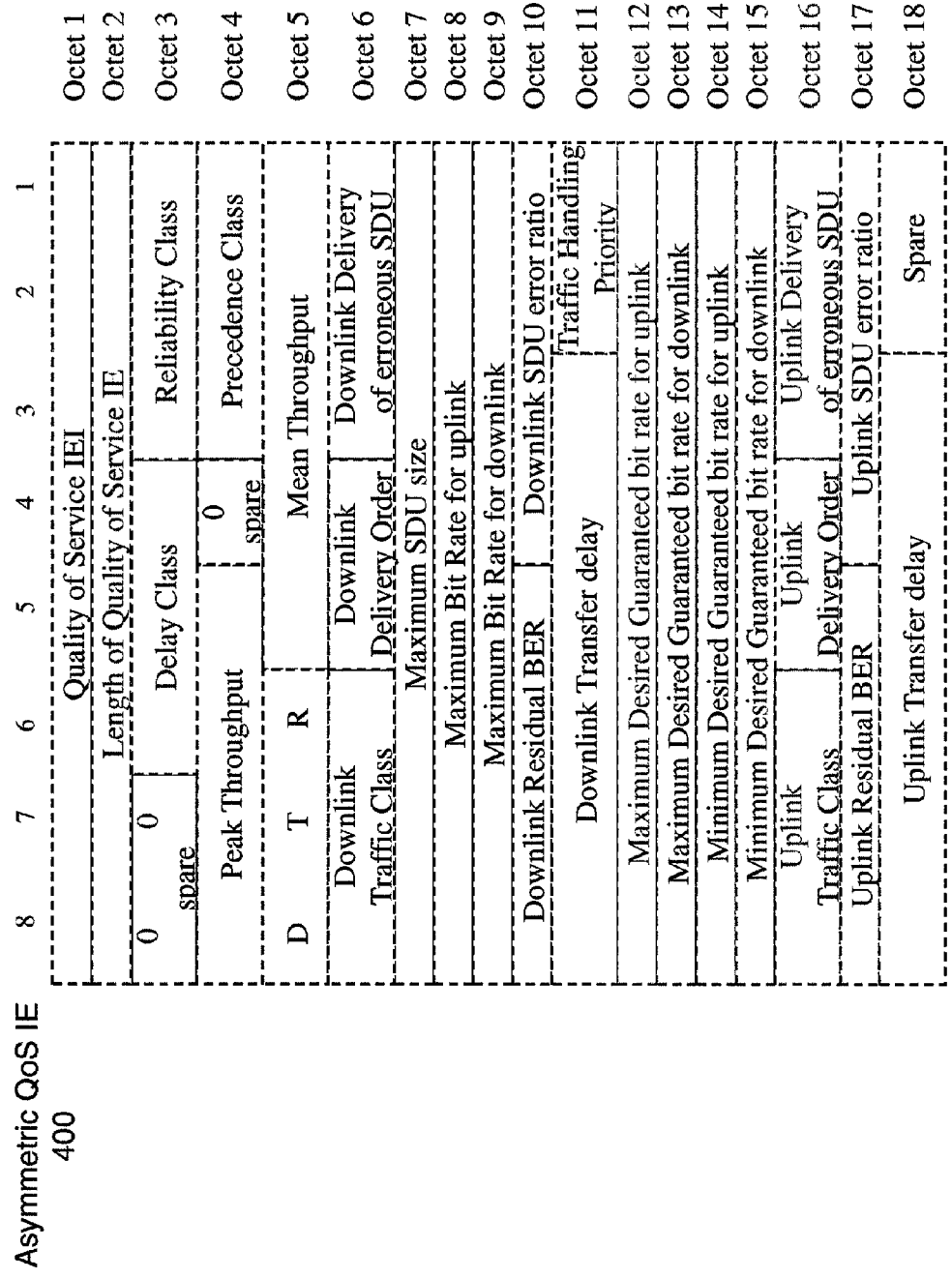
FIG. 4 shows a QoS IE in accordance with the principles of the invention.

As can be observed from QoS IE 300 of FIG. 2, only one type of traffic class can be negotiated. Therefore, in order to support asymmetric traffic class negotiation by a mobile station for services between the mobile station and the wireless system, an illustrative modified QoS IE 400 is shown in FIG. 4. The first four octets of QoS IE 400 are similar to the first four octets of QoS IE 300, described above. In the fifth octet, the previous "spare" bits are now defined as:

T bit—a set value (e.g., the bit value is recognized as a logical ONE) for indicating asymmetric traffic classes (cleared otherwise);

R-bit—a set value for indicating asymmetric needs (uplink/downlink) in SDU error ratio, residual BER, and transfer delay, (cleared otherwise); and D bit—a set value for indicating downgradeable QoS Classes, (cleared otherwise).

When the T bit is set, it means asymmetric traffic classes are to be negotiated (and, the presence of Octet 16 in the IE).

This results in downlink requirements as to traffic class, delivery order, and delivery of erroneous SDU (octet 6) that can be different from the uplink requirements for traffic class, delivery order, and delivery of erroneous SDU (octet 16). When the R bit is set, it reflects the presence of octets 17 and 18, which allows for supporting a difference in residual BER, SDU error ratio, and transfer delay in the uplink and downlink directions. Illustratively, the R bit is useful for push services where the downlink may be a streaming traffic class but the uplink can be an interactive traffic class. (Obviously, the length of the IE as communicated in octet 2 is also dependent upon the value of the D, T and R bits.) Thus, a wider variety of asymmetric needs are met by QoS IE 400 than just the bit rates as defined in QoS IE 300 of the prior art.

In addition, QoS IE 400 provides an additional feature—downgradeable QoS Classes—as indicated by the D bit. This allows for a faster PDP context set up time since it reduces retries in QoS negotiation. To complement the D bit, additional traffic classes may be defined, or combinations of existing traffic classes. (As can be observed from QoS IE 300 of FIG. 2, the traffic class field is 3 bits long—i.e., it supports eight different values—of which four convey a particular type of traffic class (as currently defined): conversational, streaming, interactive, or background.)

As an illustration, assume that additional traffic class combinations are defined for use in conjunction with the D bit as illustrated in the table of FIG. 5. For example, assume current traffic classes (conversational, streaming, interactive, or background) are defined by the bit values 001, 010, 011, 100. In addition, when the D bit is set, e.g., to a value of ONE, a traffic class bit value of 101 means request the streaming traffic class first and if that fails request the interactive traffic class; while a traffic class bit value of 110 means request the interactive traffic class first and if that fails request the background traffic class. Effectively, multiple traffic classes (to be granted in a particular priority order) are requested in a single QoS IE. As such, when the network receives this type of QoS IE, the network checks if enough resources are available to grant the first requested traffic class and, if not, immediately checks if enough resources are available to grant the second requested traffic class, etc., —without requiring rejection of the request and subsequent additional QoS IE transmissions by the MS. (Other implementations are possible. For example, if the D bit is set, an additional octet can be inserted as octet 14 (pushing subsequent octets further down, e.g., octet 18 of QoS IE 400 now becomes octet 19) for defining additional alternative traffic classes, or traffic class combinations, etc. As one illustration, combinations of three alternative traffic classes could be defined with a predefined bit pattern—first request streaming, if that is denied, then interactive, and if that is denied then background, etc. (illustrated in FIG. 5). Alternatively, when any of the D, T, and R bits are set, the SGSN checks a predefined subscription profile to get relevant information to populate an enhanced RAB assignment request message (comprising a modified form of QoS IE as shown in FIG. 4) before doing the RAB set up procedures (not described herein). This latter approach reduces the number of additional octets in the illustrative modified QoS IE 400 of FIG. 4.) Thus, with this enhancement to the QoS IE, additional information is conveyed that increases the probability that an acceptable QoS will be negotiated on the first PDP context activation procedure.

The selection of particular traffic classes (or alternatives) is, e.g., performed by the user in initiating a request. For example, if a user subscribes to a service that supports either streaming (at a higher cost) or interactive (at a lower cost), the user can specify which one to try for first by, e.g., setting a predefined field on a service profile, or preferences, screen (not shown) in the MS. When the MS subsequently performs the PDP context activation procedure (e.g., upon power-up of the MS if the service profile defines immediate registration upon power up), the D bit is set and the appropriate traffic class value is inserted in QoS IE 400 to specify, e.g., requesting a streaming traffic class first then (if streaming is not available) an interactive traffic class.

Figure 6:
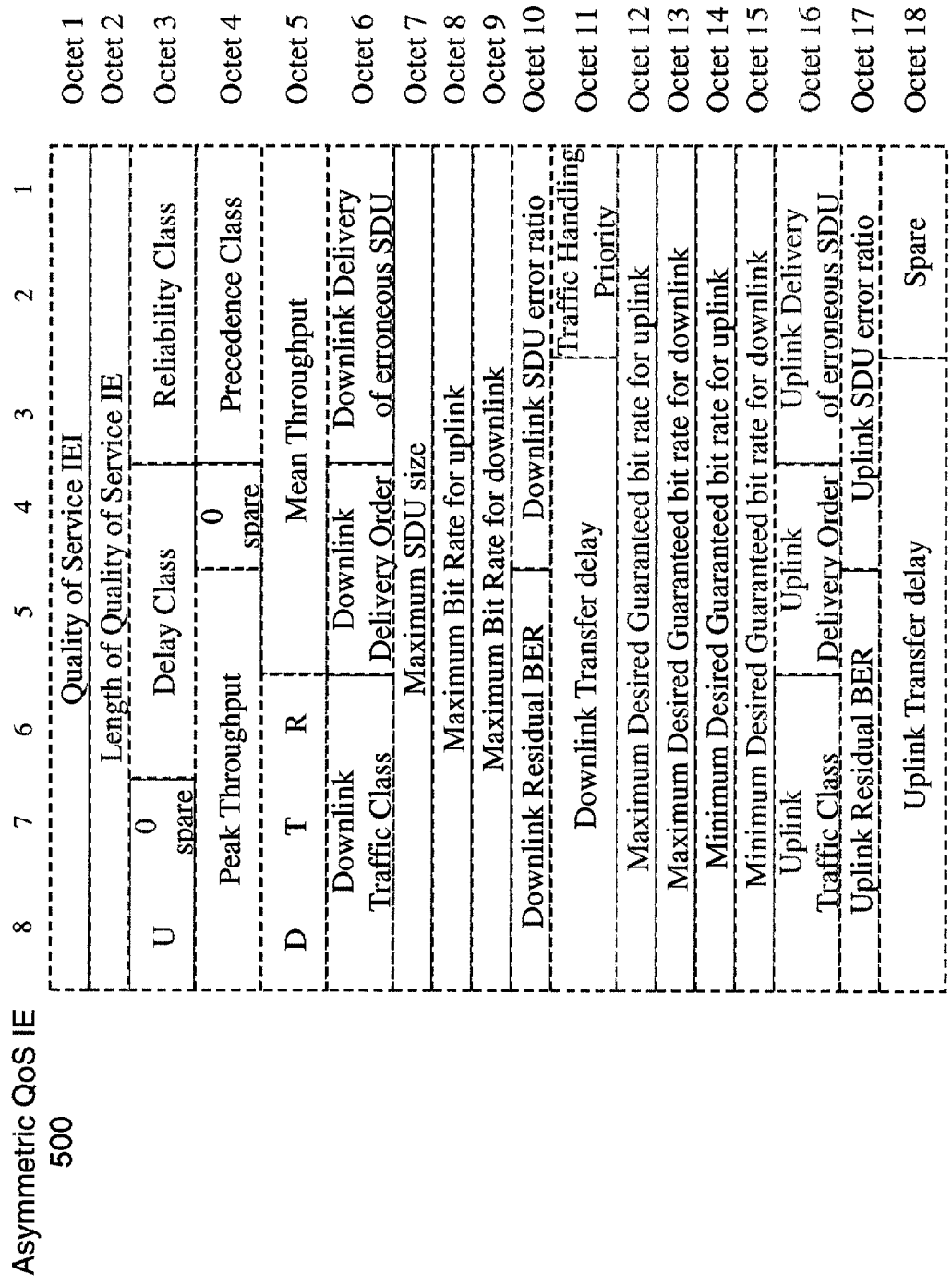
FIG. 6 shows another QoS IE in accordance with the principles of the invention.

Indeed, the ability to negotiate for any one of a number of multiple traffic classes in one QoS IE can be further extended to provide an "upgradeable QoS." This is illustrated in FIGS. 6 and 7. FIG. 6 illustrates a further modified QoS IE 500 where bit 8 of Octet 3 is used to represent an upgradeable bit—the U bit. For example, when the MS (or UE) performs a handoff, the MS may desire to upgrade its QoS, e.g., from an interactive traffic class to a streaming traffic class. In this event, bit U is set to indicate the request to upgrade the QoS. The requested change in traffic class is conveyed in the traffic class field value. (In the context of QoS IE 500, the traffic class field values are used in either the downlink traffic class (octet 6) or the uplink traffic class (octet 16).) FIG. 7 illustrates some illustrative associated traffic class field values for use when the U bit is set.

Figure 8:
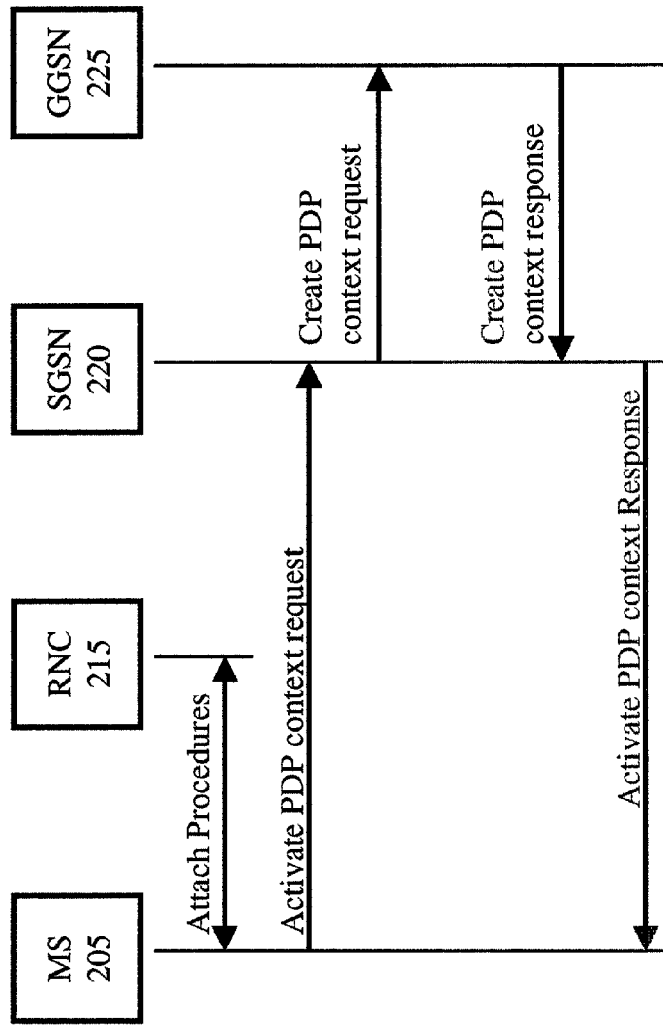
FIG. 8 shows a PDP activation procedure conveying a QoS IE in accordance with the principles of the invention.

An illustrative PDP context activation procedure utilizing QoS IE 400 of FIG. 4 is shown in FIG. 8. Other than the inclusion of QoS IE 400, this PDP context activation procedure is similar to the procedure shown in FIG. 3, and will not be described further.

Figure 9:
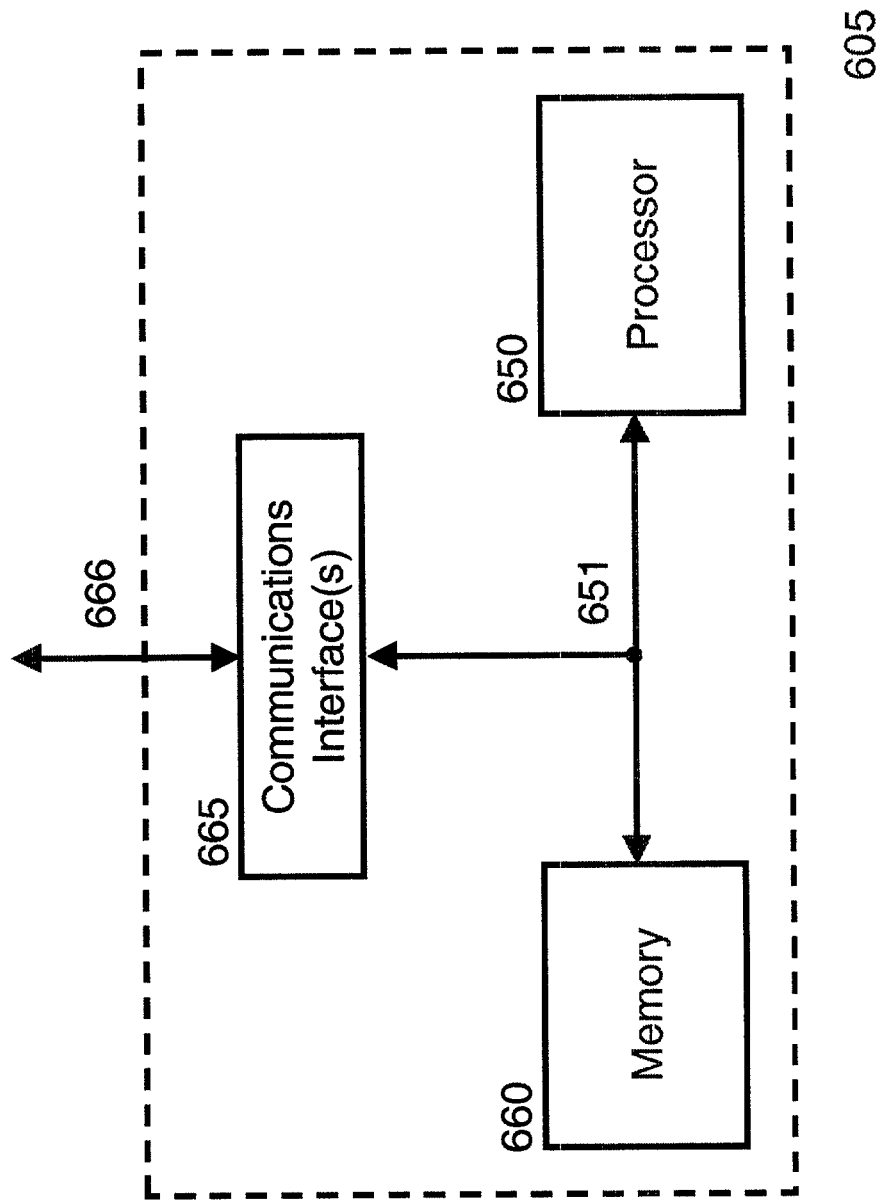
FIG. 9 shows an illustrative high-level block diagram of a packet server for use in accordance with the principles of the invention.

Turning briefly to FIG. 9, a high-level block diagram of a representative packet server for use in accordance with the principles of the invention is shown. Packet server 605 is a stored-program-control based processor architecture and includes processor 650, memory 660 (for storing program instructions and data, e.g., for communicating in accordance with the above-described modified PDP context activation procedure supporting asymmetric QoS) and communications interface(s) 665 for coupling to one or more packet communication facilities as represented by path 666 (e.g., a transceiver and associated air interface, respectively). Line 651 represents at least one bus line that provides a data path between the processor 650, memory 660, and communications interface 665.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was described in the context of a PDP context activation procedure, the modified QoS is also applicable other procedures such as, but not limited to, update PDP context, Intersystem Inter SGSN change, SRNS relocation procedures (e.g., see TS 23.060 V3.4.0), and RAB assignment messages. In addition, although illustrated in the context of UMTS, the inventive concept is applicable to any wireless system.

What is claimed:

1. A method of operating a mobile wireless station, comprising:
    attaching the station to a wireless data network;
    performing asymmetric traffic class negotiation with the network; and
    transmitting to the network a quality of service information element (QoS IE), including:
        (a) at least two traffic class fields, wherein one said field is for an uplink and another said field is for a downlink;
        (b) at least one quality of service (QoS) class indicator for prioritizing a plurality of acceptable QoS traffic classes; and
        (c) at least one of alternate traffic classes and traffic class combinations, wherein said traffic classes are selected from the group consisting of conversational, streaming, interactive, and background traffic classes.

2. The method of claim 1 wherein the QoS IE further comprises:
    a traffic class indicator indicative of requesting asymmetric traffic classes.

3. The method of claim 1 wherein the QoS IE further comprises:
    at least two residual bit error rate fields, wherein one error rate field is for the uplink and another error rate field is for the downlink;
    at least two service data unit error ratio fields, wherein one data unit error ratio field is for the uplink and another data unit error ratio field is for the downlink; and
    at least two transfer delay fields, wherein one transfer delay field is for the uplink and another transfer delay field is for the downlink.

4. The method of claim 1 further comprising the steps of:
    receiving data in accordance with a first negotiated traffic class; and
    transmitting data in accordance with a second negotiated traffic class; wherein said traffic classes are different.

5. A method of operating a packet server of a wireless network, the method comprising the steps of:
    establishing a communication link to a mobile wireless station; and
    transmitting to other the packet server a quality of service information element (QoS IE) including:
        (a) at least two traffic class fields, wherein one said field is for an unlink and another said field is for a downlink;
        (b) at least one quality of service (QoS) class indicator for prioritizing a plurality of acceptable QoS traffic classes; and
        (c) at least one of alternate traffic classes and traffic class combinations, wherein said traffic classes are selected from the group consisting of conversational, streaming, interactive, and background traffic classes.

6. The method of claim 5 wherein the QoS IE further comprises;
    at least two residual bit error rate fields, wherein one error rate field is for the uplink and another error rate field is for the downlink;
    at least two service data unit error ratio fields, wherein one data unit error ratio field is for the uplink and another data unit error ratio field is for the downlink; and
    at least two transfer delay fields, wherein one transfer delay field is for the uplink and another transfer delay field is for the downlink.

7. An apparatus for use in a mobile wireless station, comprising:
    a means for attaching to a wireless data network; and
    a means for
        attaching the station to a wireless data network;
        performing asymmetric traffic class negotiation with the network; and transmitting to the network a quality of service information element (QoS IE) including:
(a) at least two traffic class fields, wherein one said field is for an uplink and another said field is for a down link;
(b) at least one quality of service (QoS) class indicator for prioritizing a plurality of acceptable QoS traffic classes; and
(c) at least one of alternate traffic classes and traffic class combinations, wherein said at least one QoS class indicator is associated with at least one of the uplink or the downlink and said traffic classes are selected from the group consisting of conversational, streaming, interactive, and background traffic classes.

8. The method of claim 7, wherein said traffic classes are prioritized in ascending QoS traffic class order.

9. The method of claim 7, wherein said traffic classes are prioritized in descending QoS traffic class order.

10. The method of claim 1, wherein said at least one QoS class indicator is associated with at least one of the uplink or the downlink.

11. The method of claim 1, wherein said traffic classes are prioritized in ascending QoS traffic class order.

12. The method of claim 1, wherein said traffic classes are prioritized in descending QoS traffic class order.

* * * * *